United States Patent [19]

Rahnema

[11] Patent Number: 5,430,729
[45] Date of Patent: Jul. 4, 1995

[54] METHOD AND APPARATUS FOR ADAPTIVE DIRECTED ROUTE RANDOMIZATION AND DISTRIBUTION IN A RICHLY CONNECTED COMMUNICATION NETWORK

[75] Inventor: Moe Rahnema, Chandler, Ariz.

[73] Assignee: Motorola, Inc., Schaumburg, Ill.

[21] Appl. No.: 222,067

[22] Filed: Apr. 4, 1994

[51] Int. Cl.⁶ .............................................. H04J 3/24
[52] U.S. Cl. ................... 270/94.1; 370/60; 395/200
[58] Field of Search ............ 370/941, 942, 60, 54, 370/943, 60.1, 16, 17; 395/200; 364/284, 284.3, 284.4, 242.94, 229, 229.3, 229.4, 229.5, 514

[56] References Cited

U.S. PATENT DOCUMENTS

| | | | |
|---|---|---|---|
| 4,466,060 | 8/1984 | Riddle | 364/200 |
| 4,736,363 | 4/1988 | Aubin et al. | 370/60 |
| 4,756,019 | 7/1988 | Szybicki | 379/112 |
| 4,905,233 | 2/1990 | Cain et al. | 370/94.1 |
| 4,956,841 | 9/1990 | Judeinstein et al. | 370/94.1 |
| 5,018,133 | 5/1991 | Tsukakoshi et al. | 370/16 |
| 5,031,093 | 7/1991 | Hasegawa | 364/200 |
| 5,088,032 | 2/1992 | Bosack | 395/200 |
| 5,088,090 | 2/1992 | Yacoby | 370/85.13 |
| 5,095,480 | 3/1992 | Fenner | 370/94.1 |
| 5,115,495 | 5/1992 | Tsuchiya et al. | 395/200 |
| 5,150,464 | 9/1992 | Sidhu et al. | 395/200 |
| 5,175,733 | 12/1992 | Nugent | 370/94.3 |
| 5,179,556 | 1/1993 | Turner | 370/95.1 |
| 5,179,558 | 1/1993 | Thacker et al. | 370/94.3 |
| 5,214,646 | 5/1993 | Yacoby | 370/85.13 |
| 5,227,802 | 7/1993 | Pullman et al. | 342/352 |
| 5,243,592 | 9/1993 | Perlman et al. | 370/17 |
| 5,253,161 | 10/1993 | Nemirovsky et al. | 370/60 |
| 5,253,248 | 10/1993 | Dravida et al. | 370/16 |
| 5,274,642 | 12/1993 | Fisk | 370/94.1 |
| 5,282,270 | 1/1994 | Oppenheimer et al. | 395/200 |
| 5,317,566 | 5/1994 | Joshi | 370/60 |

OTHER PUBLICATIONS

"Principles of Communication Systems" By Taub & Schilling Second Edition 1986.

Ellen Pickthall, "Special Issue on Mobile Satellite Communications"; Modern Science & Technology of Telecommunications (Monthly) Nov. 1991 (Consecutive No. 142).

*Primary Examiner*—Douglas W. Olms
*Assistant Examiner*—Ajit Patel
*Attorney, Agent, or Firm*—Gregory J. Gorrie

[57] ABSTRACT

In a global communication system that includes a constellation of satellite nodes that move with respect to each other, data packets are routed across communication links in a evenly distributed fashion. Uniform link usage is achieved within allowed routes determined by end to end transport delay criteria. The routing method computes routes in advance using an iterative process which selects routes for each source-destination pair from an allowed feasible set of alternative minimal hop routes by trying to equalize link usage probabilities for the links involved at each step of the route determination process. The routing method takes into account link failures and link and node shutdowns. Minimum hop routes are selected based on maximizing network routing entropy resulting in a uniform usage of the system's communication links. Directed randomization of routes between source-destination pairs of nodes is implemented to prevent link congestion while minimizing packet transport delay. Individual routing tables are generated and maintained in each satellite node. The tables may be updated regularly to reflect changes in the traffic demand distribution and the physical node connectivity within the constellation which occur as a result of satellite motion and failures in the network.

20 Claims, 7 Drawing Sheets

| DESTINATION NODE OR GATEWAY | EXIT LINK CHOICES | | |
|---|---|---|---|
| | FIRST CHOICE EXIT LINK | SECOND CHOICE EXIT LINK | THIRD CHOICE EXIT LINK |
| ... | ... 96 | ... 98 | ... 99 |
| ... | | | |
| ... | | | |
| ... | | | |
| ... | | | |
| ... | | | |
| ... | | | |
| ... | | | |
| ... | | | |
| ... | | | |

| DESTINATION NODE | EXIT LINK CHOICES | | |
|---|---|---|---|
| | FIRST CHOICE EXIT LINK | SECOND CHOICE EXIT LINK | THIRD CHOICE EXIT LINK |
| 12h | 23dg | 21de | 23db |
| 12i | 21de | 23dg | 23da |
| 12e | 21de | 23da | 23dg |
| 12f | 21de | 23dg | 23da |
| ••• | ••• | ••• | ••• |

METHOD AND APPARATUS FOR ADAPTIVE DIRECTED ROUTE RANDOMIZATION AND DISTRIBUTION IN A RICHLY CONNECTED COMMUNICATION NETWORK

CROSS-REFERENCE TO RELATED APPLICATIONS

This application is related to co-pending U.S. patent application Ser. No. 07/858,829, filed on Mar. 27, 1992, entitled "Dynamic Signal Routing" which is assigned to the same assignee as the present application.

TECHNICAL FIELD OF THE INVENTION

The present invention relates generally to communication systems. More specifically, the present invention relates to systems that route data packets between nodes in a communication system.

BACKGROUND OF THE INVENTION

Conventional cellular communication systems adopt a method for routing communication information between nodes of the system. Communication networks, such as those used to deliver telecommunications, to interconnect computers, and the like, may include any number of nodes. The networks may deliver electronic communications between two points by routing the communications from node to node within the network. As the number of nodes in a network increases and as the number of communication paths available to each network node increases, the number of potential paths available for delivering any single communication likewise increases. Accordingly, the problem of selecting an appropriate path through the network arises. Typically, a network attempts to select the shortest possible path to minimize delay, to consume a minimal amount of network resources, and to maximize reliability in delivering a communication. At the same time, a network needs to balance this concern with a need to prevent communication traffic bottlenecks and a need to achieve the highest possible probability that a communication will be delivered to its intended destination.

In a global communication system where nodes are space based and moving with respect to each other, routing mechanisms which involve simple processing and decision making within the nodes are desirable. Furthermore, minimal exchange of any route information in the network in order to minimize node complexity and simplify route management for increased reliability and reduced cost are also desirable. Where the nodes of the communication system include satellites and there may be a possibility of satellite node and link failures, adaptive routing is desirable to balance out the traffic load over moving satellite nodes and changing cross-link capacities. Adaptive routing is also desirable to balance changing traffic load and call flow pattern over time.

Prior art techniques for adaptive routing, when implemented in a distributed fashion, require the exchange of routing update information among the network nodes. They also require processing within the node. These techniques can create synchronization problems in a satellite based network due to longer inter-satellite propagation delays. In addition, such techniques consume the scarce radio bandwidth resources. Prior art techniques also require maintenance and management of routing tables within the nodes which can take up space and also increase the possibility of error.

Alternative means of implementing adaptive routing includes centralized versions where updated routes are calculated in a centralized location and the information is either transmitted to each node in the form of a table, or otherwise distributed to each call processing gateway and used to select the optimum route at the time of establishing a call. This sort of adaptive routing is called source routing and has been implemented by some existing packet networks such as Tymnet. However, in ground based communication networks such as in Tymnet, all calls are normally processed by a single central supervisor which calculates and maintains the updated route information for each possible source-destination pair in the network. Since that single resource selects routes for each call and assigns so-called "virtual circuit" identifiers to each call, the uniqueness of such route identification is maintained for all calls throughout the network, and no confusion is created when several calls cross through one intermediate node on their journey through the network.

This situation is quite different in a global satellite based communication network where up to 20 gateways share the call processing load. Each call may be routed to and processed by a different gateway. Each gateway needs to keep track of the virtual circuit identifiers assigned to calls by other gateways in real time so that the same virtual circuit is not re-used by another gateway in identifying a route for a new call processed by that gateway. The complexity and inefficiency associated with real time exchange of route identification information among several remotely located gateways in a global communication network is undesirable.

Thus what is needed is a method and apparatus of routing data packets among nodes in a communication system where the nodes are moving with respect to each other, and where the connections or links between the nodes are changing as a function of the position of the node. What is also needed is a highly distributed routing method that is implemented autonomously by each node. What is also needed is a routing method which achieves uniforminity in the usage of network links while limiting number of hops on each path used for routing. What is also needed is a routing method which achieves uniforminity in the usage of network links while preventing link congestion. What is also needed is a routing method that actually prevents congestion, rather than reacting to it. What is also needed is a routing method that is link failure proof and routes data packets around link failures.

SUMMARY OF THE INVENTION

Accordingly, it is an advantage of the present invention that a network is provided which routes communication signals in a distributed fashion.

Another advantage of the present invention is that network resources dedicated to routing communication signals are minimized.

Another advantage is that the present invention distributes routing of data packets among various communication links.

Another advantage is that the present invention minimizes delay in delivering communication signals between network entry and exit points.

Another advantage is that the present invention compensates for communication traffic congestion.

Another advantage is that the present invention compensates for node and link failures.

Another advantage of the present invention is that it allows for updating of routing tables in communication nodes reflecting network failures and changing traffic demand patterns.

Another advantage of the present invention is that it eliminates delay ditter for voice packets and provides a measure of congestion prevention through load dispersing.

The above and other advantages of the present invention are carried out in a communication system comprising a plurality of nodes that communicate with each other over links. The invention provides a method of routing data packets among the plurality of nodes comprising the steps of finding minimum hop routes between a source node and a destination node. Each of the minimum hop routes comprise a sequence of links over which to send a data packet. The method also includes calculating a link usage probability (LUP) for each link associated with the minimum hop routes. The method further comprises selecting a first choice minimum hop route from the minimum hop routes based on the LUPs associated with each link of the minimum hop routes, and routing the data packet from the source node to the destination node over the first choice minimum hop route.

In a preferred embodiment, the method comprises the step of calculating a network routing entropy (NRE) using each of the LUPs, and further comprises the step of selecting the first choice minimum hop route based on the NRE.

In another preferred embodiment, the method comprises the steps of determining, for each of the minimum hop routes, a link having maximum value of the LUPs, and choosing the first choice minimum hop route having the link with a lowest of the maximum values.

The invention also provides a communication system that routes data packets over minimum hop routes resulting in a distributed usage of communication links. The minimum hop routes comprise a list of the communication links to send a data packet between a source node and a destination node. The system comprises a plurality of nodes that move with respect to each other, the nodes being coupled by the communication links. The system also includes multi-channel transceivers associated with each node for sending data packets over the communication links using the minimum hop routes. The system also comprises a processor coupled to each of the multi-channel transceivers. The system also comprises a control facility coupled to the nodes for determining which of the communication links will be available during predetermined time periods, finding the minimum hop routes between the nodes, calculating link usage probabilities (LUPs) for each communication link of the minimum hop routes, calculating a network routing entropy (NRE) based on the LUPs, and selecting a first choice minimum hop route from the minimum hop routes for the source node and the destination node based on the NRE.

DETAILED DESCRIPTION OF THE DRAWINGS

A "satellite" is defined herein to mean a man-made object or vehicle intended to orbit a celestial body (e.g., Earth). The word Earth is intended to include any celestial body around which a communication satellite may orbit. A "constellation" is defined herein to mean an ensemble of satellites arranged in orbits for providing specified coverage (e.g., radio communication, photogrammetry, etc.) of portion(s) or all of a celestial body. A constellation typically includes multiple planes (or orbits) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The term "satellite" is intended to include both geostationary and orbiting satellites and/or combinations thereof including low earth orbiting (LEO) satellites.

Figure 1:
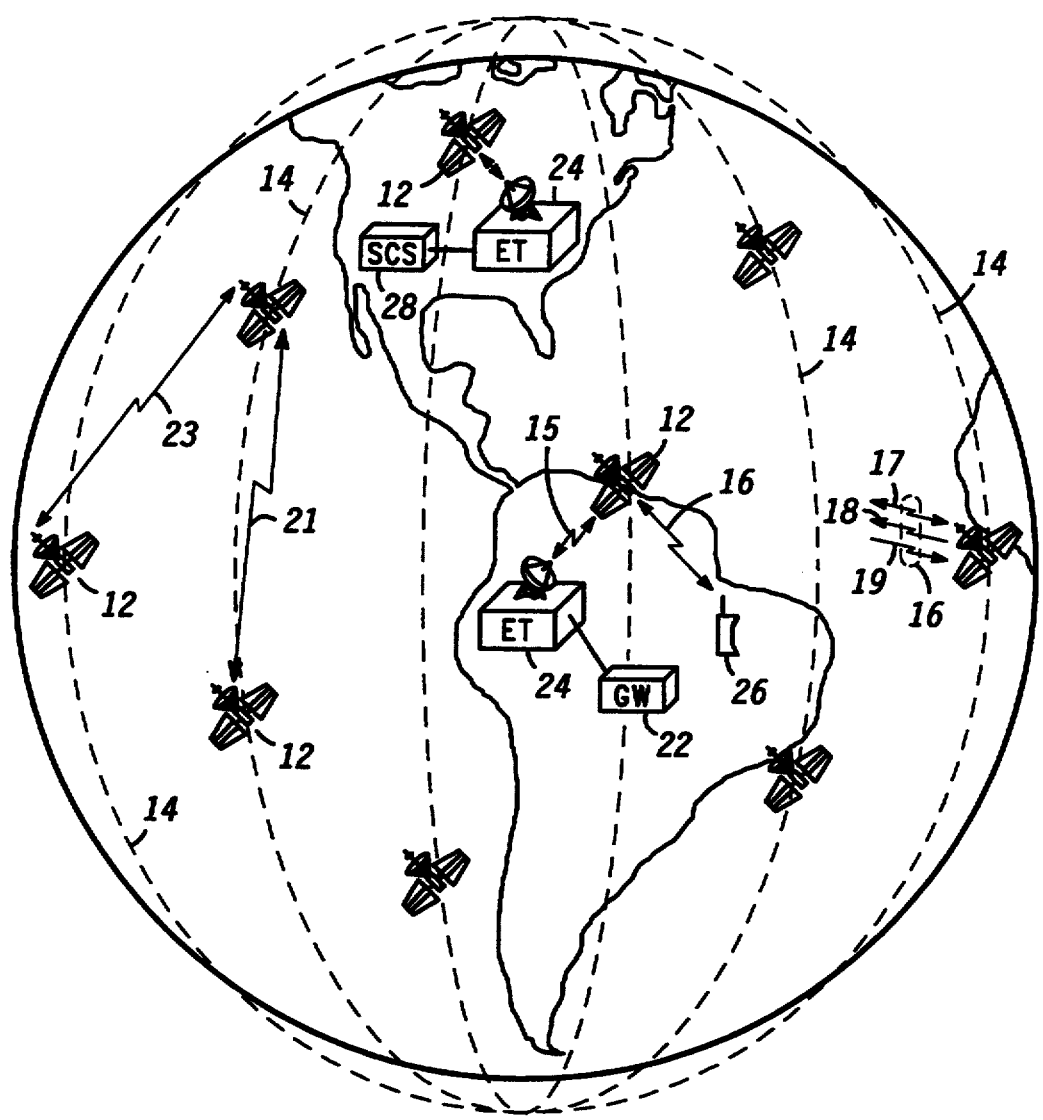
FIG. 1 illustrates a highly simplified diagram of a satellite based communication system of which the present invention may form a portion.

FIG. 1 illustrates a highly simplified diagram of satellite based communication system 10 of which the present invention may form a portion. Communication system 10 is shown dispersed over and surrounding a celestial body (e.g., Earth) through use of orbiting satellites 12 occupying orbits 14. The present invention is applicable to systems including satellites having low-Earth, medium-Earth and geo-synchronous orbits. Additionally, it is applicable to orbits having any angle of inclination (e.g., polar, equatorial or other orbital pattern).

Exemplary communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes.

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Network 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17-19, and traffic channels 17 support real-time communications. At least one traffic channel 17 is assigned for each call, and each traffic channel 17 has sufficient bandwidth to support, as a minimum, a two-way voice conversation. To support real-time communications, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like-number of independent calls.

Satellites 12 communicate with other nearby satellites 12 through in-plane cross-links 21 and cross-plane cross-links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations where full coverage of the Earth is not achieved (i.e., where there are "holes" in the communications coverage provided by the constellation) and constellations where plural coverage of portions of Earth occur (i.e., more than one satellite is in view of a point on the Earth's surface).

Figure 2:
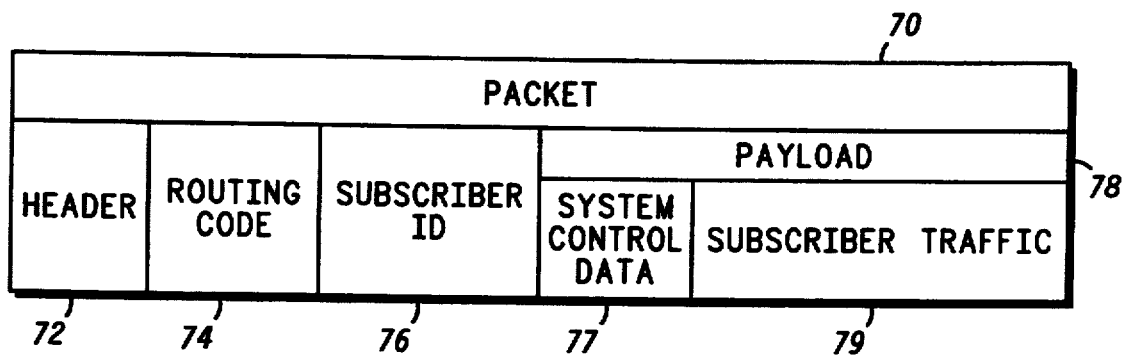
FIG. 2 illustrates an exemplary data packet used to transport communications suitable for use in a preferred embodiment of the present invention.

FIG. 2 shows a block diagram of exemplary data packet 70 that may be used to transport a communication to or from subscriber unit 26. Packet 70 includes header 72 which carries data identifying a type characterization to be associated with packet 70, a length to be associated with packet 70, and any other information conventionally included in data packet headers. The type characterization may indicate whether packet 70 exclusively conveys system control messages or whether it conveys subscriber traffic. Routing code 74 instructs system 10 (FIG. 1) where to deliver packet 70.

Subscriber ID 76 includes a code that uniquely identifies subscriber unit 26 and that is known to the identified subscriber unit and any satellite 12 (FIG. 1) providing traffic channel 17 (FIG. 1) to subscriber unit 26. Subscriber unit 26 monitors subscriber IDs 36 transmitted over broadcast channel 18 (FIG. 1) to determine if packets 70 are intended for it. Satellite 12 uses subscriber IDs 76 of packets 70 that carry subscriber unit traffic to route such packets 70 to traffic channels 17 assigned to the identified subscriber unit 26.

Header 72, routing code 74, and subscriber ID 76 represent overhead data which serve to get packet 70 to its destination. At the packet's destination, payload data 78 are consumed. In other words, the purpose of sending packet 70 to a destination is typically to deliver payload data 78, not header 72, routing code 74, or subscriber ID 76. Payload data 78 includes either system control data 77 or system control data together with subscriber traffic 79 (e.g., voice and/or data). System control data are commands or messages which are interpreted and acted upon by subscriber units 26. These commands are typically very short. When system control data are delivered over broadcast channel 18 (FIG. 1), subscriber traffic 79 is omitted, and the resulting packet is very short so that as many messages as possible may be broadcast over a broadcast channel. Subscriber traffic 79 represents subscriber data transported in the course of a call. When packet 70 is delivered over traffic channel 17 (FIG. 1), a significant amount of subscriber traffic is appended. As discussed above, a digitized version of an entire frame of conversational audio may be conveyed by subscriber traffic 79.

Routing code 74 desirably includes a Call Sequence Number (CSN) to differentiate between various calls within a gateway, or on a subscriber unit link to the originating or terminating satellite. The CSN maps a packet to its assigned RF channel on the link. The CSN may also be included in other portions of packet 70. Routing code 74 also includes a destination satellite number. The destination satellite number is desirably assigned by the call control gateway that keeps knowledge of the constellation motion and the time dependent coverage zone of each satellite 12 as it moves. The destination satellite number is used by satellites 12 (FIG. 1) to route a packet to its destination satellite. At the destination satellite, the packet is transmitted on a downlink (i.e., subscriber unit link 16) to either a subscriber unit 26, or to a gateway 22.

Compared to the size of subscriber traffic 79, the length of system control data 77 is generally very small. Thus, system control data 77 may be delivered to subscriber unit 26 along with subscriber traffic 79 while a call is ongoing. Examples of system control messages which may be delivered with subscriber traffic 79 via a traffic channel 17 include messages which inform subscriber unit 26 that the other party to a call has "hung-up", that another call is waiting for the subscriber unit 26, and any number of annunciation data messages which result in a voice message or another form of annunciation being presented to the user of subscriber unit 26.

Figure 3:
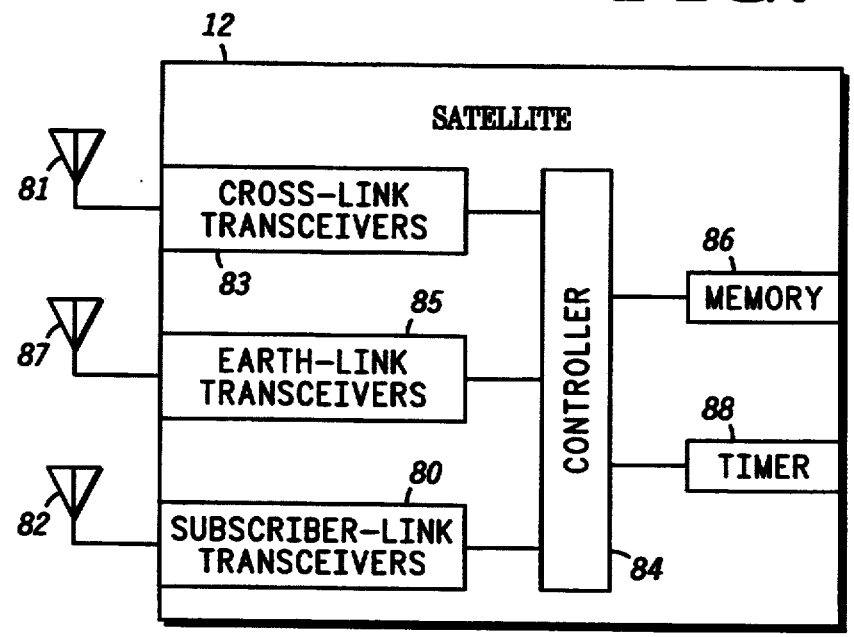
FIG. 3 illustrates a simplified block diagram of a satellite radio communication node suitable for use in a preferred embodiment of the present invention.

FIG. 3 illustrates a simplified block diagram of a satellite radio communication node suitable for use in a preferred embodiment of the present invention. Satellite node 12 is provided by a satellite 12. Preferably, all satellites 12 within system 10 (see FIG. 1) include equipment as illustrated by the block diagram of FIG. 3. Satellite 12 includes cross-link transceivers 83 and associated antennas. Transceivers 83 and antennas 81 support cross-links to other nearby satellites 12. Earth-link transceivers 85 and associated antennas 87 support earth-links to communicate with earth terminals 24 (FIG. 1). Moreover, subscriber-unit transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 81, 87, and 82 may be implemented either as single multi-directional antennas or as banks of discrete antennas. It is desirable that subscriber unit antenna be a phased array antenna capable of accessing many cells 34 (FIG. 1) simultaneously.

A controller 84 couples to each of transceivers 83, 85, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated due to the operation of satellite 12.

Figures 4, 5:
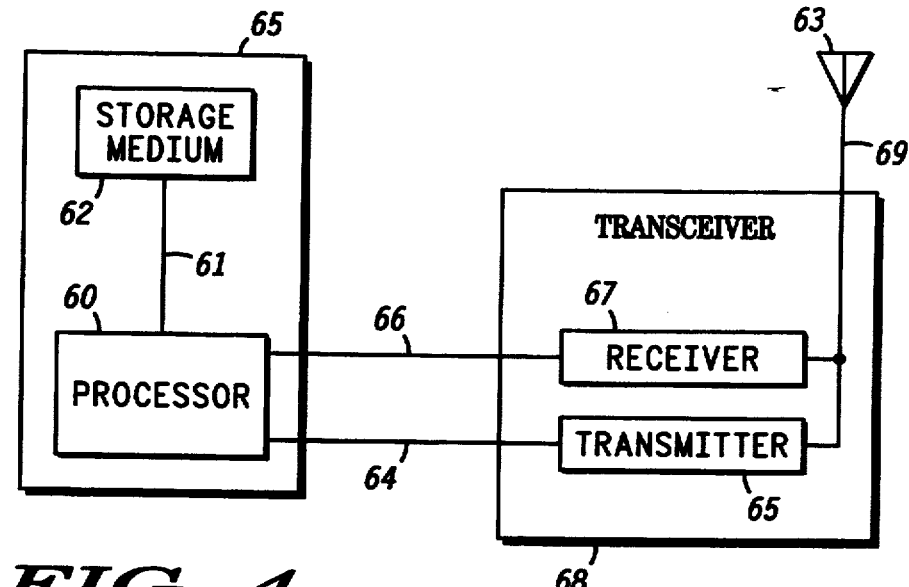
FIG. 4 illustrates a simplified block diagram of a portion of a system control station and an earth terminal suitable for use in a preferred embodiment of the present invention.
FIG. 5 illustrates an example of a routing table data structure suitable for use in a preferred embodiment of the present invention.

FIG. 4 illustrates a simplified block diagram of a portion of control station 65 and earth terminal 68 suitable for use in a preferred embodiment of the present invention. Control station 65 and terrestrial station 68 are desirably part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 63 coupled to transmitter 65 and receiver 67 via link 69. Transmitter 65 and receiver 67 are coupled to processor 60 via links 64 and 66, respectively. Processor 60 desirably carries out procedures exemplified below and described in associated text. For example, in addition to performing other tasks as appropriate, processor 60 desirably stores results from such procedures in storage medium 62. Transmitter 65 and/or receiver 67 transmit messages to and/or receive messages from satellites 12.

Conventional cellular radio units and systems are described for example in U. S. Pat. Nos. 4,783,779, 4,144,412, and 5,097,499 and satellite communication systems are described for example in U. S. Pat. Nos. 4,722,083 and 4,819,227. These patents are herewith incorporated by reference. Subscriber unit antennas 82 (FIG. 4), subscriber unit transceivers 80 (FIG. 4), control station 28 (FIG. 1) and earth terminal 24 (FIG. 1) perform those functions and contain at least those equipments conventionally associated with switched terrestrial or satellite cellular communication systems, plus additional functions and equipment explained in more detail below.

Processor 60 generally controls and manages user access, message reception and transmission, channel set-up, radio tuning, frequency and time slot assignment, and other cellular radio communication and control functions not managed or provided for by controller 84 (FIG. 4). Among other things, processor 60 and- /or controller 84 (FIG. 4) desirably executes procedures to allow user access to communication system 10.

In a preferred embodiment of the present invention, communication system 10 (FIG. 1) comprises 66 LEO satellites arranged in 6 orbits each containing eleven satellites 12. In reference to FIG. 1, each satellite 12 is coupled to two other satellites 12 within the same orbit 14 or orbital plane by in-plane cross-links 21. The capacities of in-plane cross-links 21 remain constant. Link capacity includes data carrying capacity. In a preferred embodiment, the cross-link capacity ranges from 100 to 200 packets for each frame time and is preferably about 140 packets per 9 milliseconds frame time. The capacities of cross-plane cross-links 23 (e.g., left and right cross-links) on the other hand vary from a maximum value when the satellites are furthest apart to a minimum value as cross-plane links 23 are shut down. For example, referring to FIG. 1, satellites 12 in different orbits 14 are furthest apart when near the equator, and are closest together near the poles. In a preferred embodiment, cross-plane cross-links 23 are shut down as part of a cell management process. Cell management processes suitable for use in the present invention are discussed in U.S. Pat. No. 5,227,802 titled "Satellite System Cell Management" assigned to same assignee as the present invention and is incorporated herein by reference.

Also, in the preferred embodiment of FIG. 1, there are no cross-plane cross-links 23 at the seam which occurs between orbits on the opposite sides of the earth where satellites 12 are moving in opposite direction to each other. At the seam, the movement of satellites causes Doppler shifts too large for proper RF communication. As the earth completes a full rotation in 24 hours, the seam sweeps across the surface the earth once every 24 hours.

As each satellite 12 moves through its orbits, cross-plane cross-links 23 between two satellites in neighboring orbits varies in capacity from a maximum at equator to zero when the link are turned off. Cross-link shut down occurs at an angle of around sixty-eight degrees from the equator. The cross-plane links are preferably turned off to maintain TDMA synchronization, among other things. Cross-plane links 23 remain off until the associated satellite crosses a pole and are turned back on at approximately a latitude of (i.e., 180–63 degrees) where the cross-link picks up capacity. The same cycle occurs as a satellite approaches the other pole. Moreover, as two cross-plane connected satellites travel over a pole, they switch sides in the sense of the left and right neighboring node connections. A time variation in the relative node connectivity and topology occurs as the constellation rotates. Physical routing information stored within the nodes (i.e., for reaching other nodes from that node) requires regular and predictable time updating. Regularly recurring time variations of satellite node connectivity within the constellation is desirably quantized into a number of well defined distinct topology states for the constellation. The periodic motion and position of the various satellites within the constellation is known and stored in the system.

FIG. 5 illustrates an example of a routing table data structure suitable for use in a preferred embodiment of the present invention. The routing information used by a packet entering a satellite node to determine the cross-link to exit will be organized as a look-up table using the packet's destination. In a preferred embodiment, the look-up table may be stored in RAM based memory including a seven-bit address to the table for the packet's destination. The stored information at each address location includes a maximum of three link designators. Table 90 shows first choice link designator 96, second choice link designator 98 and third choice link designator 99, listed for each destination satellite or gateway. Each link designator specifies either a left, right, fore, or aft cross-link. As discussed previously, each satellite node is connected through these links to at most four other neighboring satellites at any time.

First choice exit link designator 96 specifies the link in the direction of minimal hop route toward the destination. Second choice exit link designator 98 specifies the link in the direction of a second choice minimal hop route if one exists, otherwise it specifies the link in the most reasonable direction towards the specified destination. Third choice exit link designator 99 specified in routing table 90 lists another link in the next most reasonable direction towards the specified destination. In a preferred embodiment, any or both of the second or third choices may specify a "null" link, where no other links are available due to cross-plane cross-link shut down or link failure.

Since the constellation connectivity (i.e., connections between satellite nodes, and connections between satellite nodes and individual gateways on the ground) continues to change with the motion of the satellites, routing table 90 properly reflects the necessary changes. In one embodiment, each satellite stores a number of different tables (one for each state of the constellation connectivity) and uses the applicable table as the satellite moves through the different states of the constellation connectivity.

In another embodiment, a single routing table is used at each satellite, and the contents of the table are updated as the satellite moves through the different states of the constellation connectivity. Partial lookahead routing information is preferably transferred by an uplink from SCS 28 (FIG. 1) and stored in satellite 12 (FIG. 1) at regular intervals of time during a full orbit.

Regardless of which embodiment is used to keep the routing information within the nodes updated with respect to changes in constellation connectivity due to motion alone, updates to the routing information are required to reflect and account for any link and node failures which may occur in the constellation. SCS 28 (FIG. 1) preferably re-computes the proper exit link choices for each node (e.g., for reaching any other node) and transmits the information to the various nodes. Updates of the system configuration in response to link failures are desirably done on a threshold basis (i.e., when a certain number or pattern of link failures is reported to the SCS). Updates of the system configuration may also be done on a periodic basis with the update period being related to the mean time between failures for the nodes or links in the constellation. Since, the SCS involvement is required for utilizing failure information, the later embodiment provides the advantage of reduced memory requirement for storing the minimal routing information required in the satellites. The extent to which the routing information is computed ahead of the time and stored in the satellites depends on the tradeoff between storage space in the satellites, and a reduced response time to failures.

The computation of routing information involves the computation of the first, second and third exit link choices for each node to reach any other node for each distinct state (e.g., a defined time interval) of the constellation configuration. This process is desirably performed by the SCS in non-real time and the results are sent to the satellites for recording in routing table 90 as discussed previously.

For example, suppose a path between a first node, and a second node for a time interval (t1–t2) reflecting the duration of a distinct connectivity state for the constellation consists of the sequence of links or hops between the satellite nodes. In other words, to transfer a data packet from the first node to the second node, a first, second, third and fourth link may have to be used hopping three satellite nodes in between. If the time average capacities of these links (averaged over the time interval t2–t1) is C1 for the first link, C2 for the second link, C3 for the third link and C4 the fourth link, the minimum average capacity for the path between the first node and the second node for that time interval can be defined as the minimum of C1, C2, C3, and C4.

A particular path comprises a sequence of links between a pair of nodes. A path is available when its minimum average capacity for the time interval under consideration is above a certain threshold. This threshold is set to a predetermined value.

The computation of a first exit choice (i.e., the more preferable of links to use in transmitting a data packet away from a node) designates the minimal hop route to the destination from that node. All cross-links which are not available for the interval of time (i.e., the constellation state for which the routes are being computed) are eliminated. Any failed links are also eliminated. The link designating the minimal hop route to the destination from the node is determined. In case there are two such paths with the same hop length, the one with the higher minimum path capacity is selected as the first choice exit link in table 90. The link with a smaller minimum path capacity is placed as the second link choice entry in the table. Where two alternate minimal hop paths have the same minimum average path capacities, the order of listing them as first or second exit link choices is not important as far as reaching a particular destination is concerned. Alternate equivalent choices over at least each neighboring set of nodes are desirably equally represented in the routing table for reaching the various destination nodes in the constellation. The routing tables effectively splits the load among the links and achieves increased randomization of the routing strategy.

Figures 6, 7:
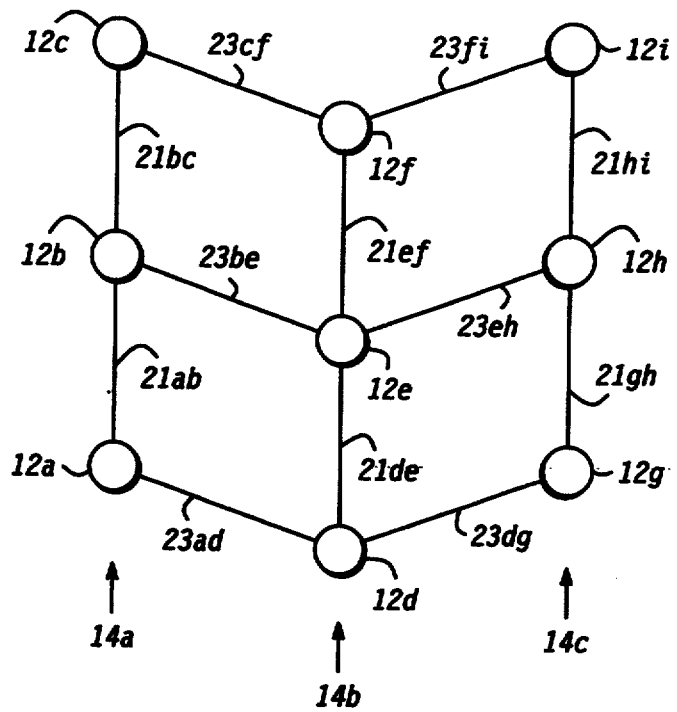
FIG. 6 illustrates a small portion of a constellation of satellite nodes connected by communication links.
FIG. 7 illustrates a partial node routing table suitable for use in a preferred embodiment of the present invention.

FIG. 6 illustrates a small portion of a constellation of satellite nodes connected by communication links. FIG. 6 shows three sequential nodes in each of three adjacent orbits. Satellite nodes 12a, 12b and 12c are in orbital plane 14a, satellite nodes 12d, 12e and 12f are in orbital plane 14b, and satellite nodes 12g, 12h and 12i are in orbital plane 14c. Satellite nodes are connected with inplane cross-links 21ab, 21bc, 21de, 21ef, 21gh and 21hi. Satellite nodes are also connected with cross-plane crosslinks 23ad, 23be, 23cf, 23dg, 23eh, and 23fi. In a preferred embodiment of the present invention, many more nodes are similarly connected.

FIG. 7 illustrates a partial node routing table suitable for use in a preferred embodiment of the present invention. FIG. 7 shows first choice exit links 44, second choice exit links 46 and third choice exit links 48 for node 12d (FIG. 6) for given destination nodes 42. By referring to FIG. 6, the first choice exit links for routing from node 12d to nodes 12h and 12i is determined. This determination is preferably made for a state of the configuration at a specific interval of time for which the cross-plane cross-link 23dg, and cross-plane cross-link 23eh will have the same minimum average capacity. In that case, there are two equivalent minimal hop paths from node 12d to node 12i. One minimum hop path would use in-plane cross-link 21de, satellite node 12e, cross-plane cross-link 23eh, satellite node 12h and in-plane cross-link 21hi.

The other minimum hop path between satellite nodes 12d and 12i would use cross-plane cross-link 23dg, satellite node 12g, in-plane cross-link 21gh, satellite node 12h and in-plane cross-link 21hi. Both of these alternate minimum hop paths utilize three cross-links. Likewise, there are two equivalent alternative minimal hop paths from node 12d to node 12h. One path utilizes cross-links 21de and 23eh while the other utilizes cross-links 23dg and 21gh. In the routing table for node 12d at the system state under consideration, if link 23dg is listed to be the first choice exit link for reaching node 12h, link 23dg would be listed as the first choice link for reaching node 12i in order to properly split the total load over the four links: 23dg, 21gh, 21de and 23eh. These first choice exit links are listed in table 40 for the specific destination node 42.

The second choice for exiting a given node to reach a destination is listed in table 40 as the link for routing over a second equivalent alternate minimal hop path if one exists. Otherwise, the next most reasonable link choice in the direction of the destination from that node is listed. The availability of other links on the path conjectured for reaching the destination node is considered. The path conjectured over that link desirably uses minimal hop routes (for that state of the constellation configuration and failure state of the links) from subsequent nodes to the destination. A reasonable link choice is a link which will not take a data packet too far away from the direction to its destination. For example, a link which routes a packet in the opposite direction from its destination would not be a reasonable choice, whereas a link which would route the packet slightly away from its destination would be a reasonable alternate choice for this purpose.

In a situation where there are two equivalent alternate reasonable choices to list as the second choice for routing from the node to a destination, the listing of one or the other as the second exit choice is not important as far as reaching a particular destination is concerned. However, the alternate equivalent choices over at least each neighboring set of nodes are desirably represented in the routing table for reaching the various destination nodes in the constellation. This design feature of the routing tables brings an aspect of the effective load splitting and directed randomization achieved by the routing strategy.

For example, assume the constellation is in a state (e.g., some time interval) for which links 23ad, 23dg, 23be, and 23eh have approximately the same minimum average capacity. For routing a packet from node 12d to node 12e, the two equivalent second choice paths use links 23ad, 21ab and 23be and links 23dg, 21gh and 23eh respectively. Likewise, the two equivalent second choice paths for routing from node 12d to node 12f utilize links 23ad, 21ab, 23be and 21ef and links 23dg, 21gh, 23eh and 21ef respectively. If link 23ad is listed in table 40 as an exit link for routing towards node 12e, link 23dg must be listed as the exit link for routing toward node 12f in order to split the total load from node 12d to node 12f over the links 23ad, 21ab, 23be, 23dg, 21gh, and 23eh. These are listed as the second choice exit link for partial routing table 40 for node 12d (FIG. 6).

The determination of a third link choice proceeds as stated in the previous discussion except that the link leading to the path with smaller minimum average capacity is preferably selected. Where there is an equivalent route not listed as a second choice, that route should be listed as the third choice exit route on routing table 40. When there is no link remaining leading up to a reasonable direction towards the destination, the remaining link is listed as third choice exit link 48 of table 40. Note that a data packet should not be sent back over the link which it arrived at the node. This is illustrated in table 40 for routing from node 12d to node 12h and 12i where third choice exit links to node 12a has been listed as the third choice in the routing decision making process at node 12d.

From the partial routing information presented in routing table 40 for node 12d (FIG. 6), each of the exit links used (23ad, 23dg, 21de) are listed in the table with the same frequency (i.e., each exit link is listed four times). Load balance is achieved with the uncertainty in the traffic load pattern over the network by distributing the load to achieve equal usage of each link in the network. This is accomplished while satisfying transport delay requirements. In a preferred embodiment the routing tables contain all listed available link choices with the same overall frequency and are desirably used as a guide in a systematic computation of alternative link choices implemented in the SCS for reaching various destinations from a given node.

Figure 8:
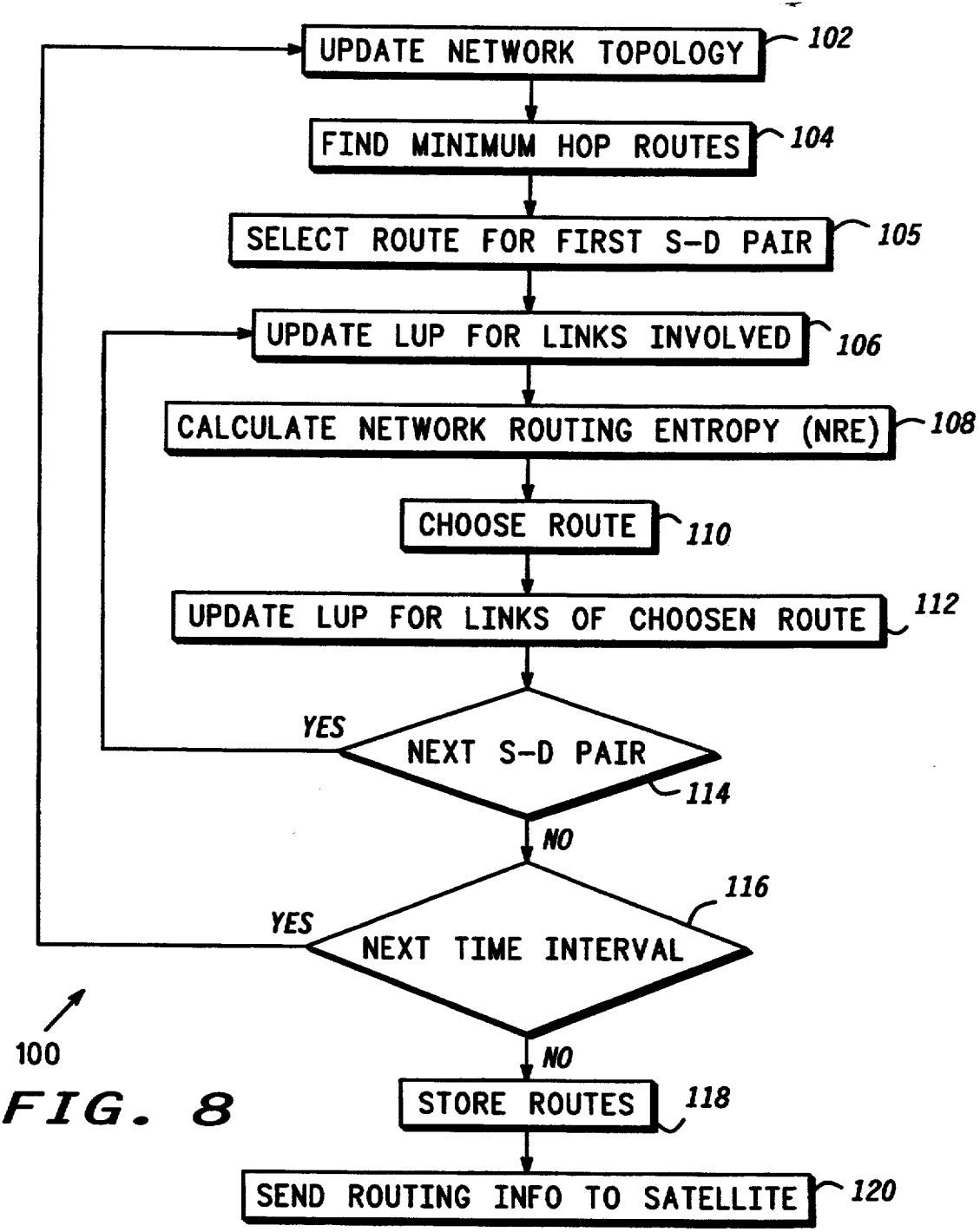
FIG. 8 shows a procedure for determining routing of data packets within the constellation suitable for use in a preferred embodiment of the present invention.

FIG. 8 shows procedure 100 for determining routing of data packets within the constellation suitable for use in a preferred embodiment of the present invention. Procedure 100 is desirably performed on a regular basis, and in a preferred embodiment, is performed whenever a link fails or is turned off. In one preferred embodiment, procedure 100 may be performed only once. Procedure 100 pre-computes routing information for all possible combinations of source - destination node pairs for each constellation configuration. As discussed previously, different constellation configurations result from the different orbital positions of the satellite nodes resulting in changing link capacities and link shutdowns. Further, different constellation configurations may result from link and node failures. Procedure 100 may also pre-compute routing information for all possible combinations of source-destination node pairs for distinct time intervals ranging from 15 seconds to several minutes. During these time intervals, the constellation configuration does not change appreciably.

Task 102 updates the network topology. Failed links and links shut down during the next predetermined time interval are removed from consideration for routing. The links may have been shut off by a cell management process which shuts off satellite links and cells due to antenna pattern overlap as the satellites approach the poles.

Task 104 finds all minimum hop routes for all possible source-destination pairs. Any node can be a source for a data packet and any node can be a destination for the data packet. A source-destination pair includes the source and the destination satellite node. In the preferred embodiment of 66 satellite nodes, there are 4290 (66×65) possible source - destination pairs. However, since it may be desirable for a data packet to be routed over a different path when traveling in the reverse direction between a source and destination node, there are 4356 (66×66) possible directional source - destination pairs. A minimum hop route is found by determining the route with the minimum number of links between the source and destination nodes. There may be several minimum hop routes with the same number of links and satellite nodes to "hop", all of which are found by task 104. In the case where there is only one minimum hop route, alternate hop routes are found having a hop length below an acceptable threshold. For example, an acceptable threshold may be based on the amount of delay acceptable for satisfactory communications for a particular type of data packet (i.e., voice or data).

Desirably, minimum hop routes are found for each constellation configuration. In a preferred embodiment, the time interval of each constellation configuration is divided into smaller time intervals over which the constellation configuration is quasi-stationary (i.e., links and link capacities somewhat fixed). In this embodiment, all source - destination pair combinations are randomly numbered.

Task 105 selects one minimum hop route found in task 104 for the first source - destination pair. The one minimum hop route selected may be arbitrarily chosen when there are several minimum hop routes. Desirably, the remaining minimum hop routes are recorded as alternative choice routes as previously discussed. The alternative choice minimum hop routes are desirably used when the first choice minimum hop route is unavailable, for example, when a link of the first choice minimum hop route fails subsequent to the updating of routing information by this process.

Task 106 calculates a link usage probability (LUP) for the first source - destination (S-D) pair and the selected minimum hop route found in task 105. Each time a route is considered, the LUP for all links involved in that route are updated. In one preferred embodiment, task 106 may compute or update a LUP for each link of a selected minimum hop route. The LUP may be calculated from the following expression:

$$LUP = (Fi/Nj)*Dj$$

where Fi is the number of times link "i" is involved in paths considered for the source - destination pairs up to this point. Nj is the total number of source - destination pairs "j" considered at this point in procedure 100. Dj represents the percent of traffic projected for the source - destination pair "j" over the time interval for which the network routing information is being computed. In one variation of this embodiment, Dj is set to "one" when the distribution of traffic (i.e., demand for communication services) over the network to be carried over the source - destination pairs are not considered.

In determining routing, "j" is incremented for each source - destination node and the LUP for each link involved in the selected route is updated. Once the LUPs for each link are calculated for the selected route, task 108 calculates a network routing entropy (NRE). The NRE may be calculated by the following expression:

$$NRE = -sum_i[(LUP)_i * \log(LUP)_i]$$

The NRE is minus the sum of the product of LUP and the Log of the LUP for each link in the constellation. Task 108 also updates the NRE each time task 108 is executed (i.e., for each source - destination pair considered).

Task 110 chooses a minimum hop route from the minimum hop routes found in task 104 for the source - destination pair under consideration which results in the largest NRE for the network as a primary choice route. Minimum hop routes resulting in the next largest NRE are selected as alternative or secondary routes in the routing tables.

In an alternative embodiment, task 110 determines the link of each minimum hop route having the maximum LUP for that minimum hop route. Task 110 then chooses the one minimum hop route which includes the link with the smallest of the maximum LUPs. The smallest maximum LUP is a reasonable approximation to the total network entropy since the local entropy of alternative minimum hop routes are considered for the source - destination pair under consideration.

Task 112 updates the LUP for each link of the minimum hop route chosen as a first choice route in task 110. The minimum hop route(s) not selected are preferably listed as alternative minimum hop routes, in the order of their LUP or resulting NRE.

Task 114 determines if all S-D pairs in the constellation of nodes have been considered, and if not, proceeds back to task 106 to consider the next S-D pair combination (i.e., j is incremented by one). Tasks 106–112 are repeated for all other source - destination pairs. When all S-D pairs are considered, minimum hop routes have been selected for each S-D pair. Task 116 determines if all known constellation configurations and time intervals have been considered. For example, during certain portions of an orbit of a node, several cross-plane crosslinks may be turned off. This occurs at certain times during an orbit and different alternative minimum hop routes are therefore chosen.

When all constellation configurations and time intervals have been considered, task 118 stores the route information. The stored information includes a list of selected minimum hop routes for each S-D pair for each constellation configuration during predetermined periods of time. In one embodiment, called a virtual path embodiment, the complete set of routing information (i.e., selected minimum hop routes) is stored in call control centers, for example SCS 28 (FIG. 1). In the virtual path embodiment, each packet desirably includes a tag indicating the route over which it is to be routed as the packet travels from node to node. The tag identifies a source - destination pair for which the route was determined by tasks 102–116.

In the virtual path embodiment, task 120 sends routing information (i.e., lists of first, second and third choice minimum hop routes) to each node for the selected minimum hop routes that use that node as a source or transit node. The routing information sent to each node is desirably in the form of tables. The routing table sent to each nodes lists each route with a tag identifying the route. In this way, each node only has information on the next node of the route associated with each tag. Therefore, all routing information for all source - destination pair combinations does not have to be stored in each node of the constellation. When a node receives a data packet, the node uses the packet routing tag to find the next node of the first choice minimum hop route to which to send the packet.

Those of skill in the art will appreciate the advantages of the virtual path embodiment including the prevention of link congestion and improved routing performance. While the virtual path embodiment provides these and other advantages, other embodiments may also be desirable.

For example, in another embodiment, referred to as a datagram embodiment, each data packet identifies a destination node as part of the packet ID, rather than identifying a source - destination pair as in the virtual path embodiment. The datagram embodiment routes data packets to destination nodes independent of which node the packet was received from, and independent of the packet's source node. In the datagram embodiment, routing tables for each node of the constellation are determined preferably by SCS 28 (FIG. 1) as discussed below. The routing information determined by tasks 102–116 is used to determine the number of selected hop routes which use each node as a source node or transit node for sending a data packet to each other destination node in the constellation. Based on the number of selected hop routes which use a node, the percentage of selected hop routes which use each link associated with the node is determined. This process is done for each node in the constellation. The percentages determined are used as probabilities for which a node uses one of its indicated links to route a data packet to an identified destination node.

In the datagram embodiment, task 118 generates a table for each node of the constellation based on these percentages. The table may be different for each node, and desirably includes for each destination node, the probability for which to use each link. In one embodiment, a node may have four exit links. Three of the four exit links may lie on selected hop routes for a particular destination node. In this case, the table would inform the node to use each of the three links at a percentage based on the frequency each link is included in the selected hop routes. Thus one link may be listed seventy percent of the time, for example, while the other two links may be listed twenty percent and ten percent of the time, respectively, for the particular destination node. In the datagram embodiment, task 120 sends each of the individual tables to the appropriate node to use for routing data packets.

The datagram embodiment routes data packets to destination nodes independent of which node the packet was received from, and independent of the packer's source node. Those of skill in the art will understand that although the datagram embodiment does not utilize to the full extent, the routing information determined by tasks 102–116 as does the virtual path embodiment, one advantage to the datagram embodiment is that it requires less information to be carried by each data packet because each data packet carries only the identified destination node. For example in the preferred embodiment of 66 satellite nodes, only a seven-bit address is necessary to identify all possible destination nodes, while in the virtual path embodiment, at least a thirteen bit address is necessary to identify one of all possible source - destination pair combinations.

Decision making routing logic is required in the satellites nodes to route data packets. In a preferred embodiment, the decisions in a satellite node are implemented through logic gates although those of skill in the art will understand that other implementations will also work. In one embodiment, routing logic decisions are performed based on a destination address indicated in each data packet. The routing decisions vary depending on whether the node is an originating, an intermediate or destination node.

Figure 9:
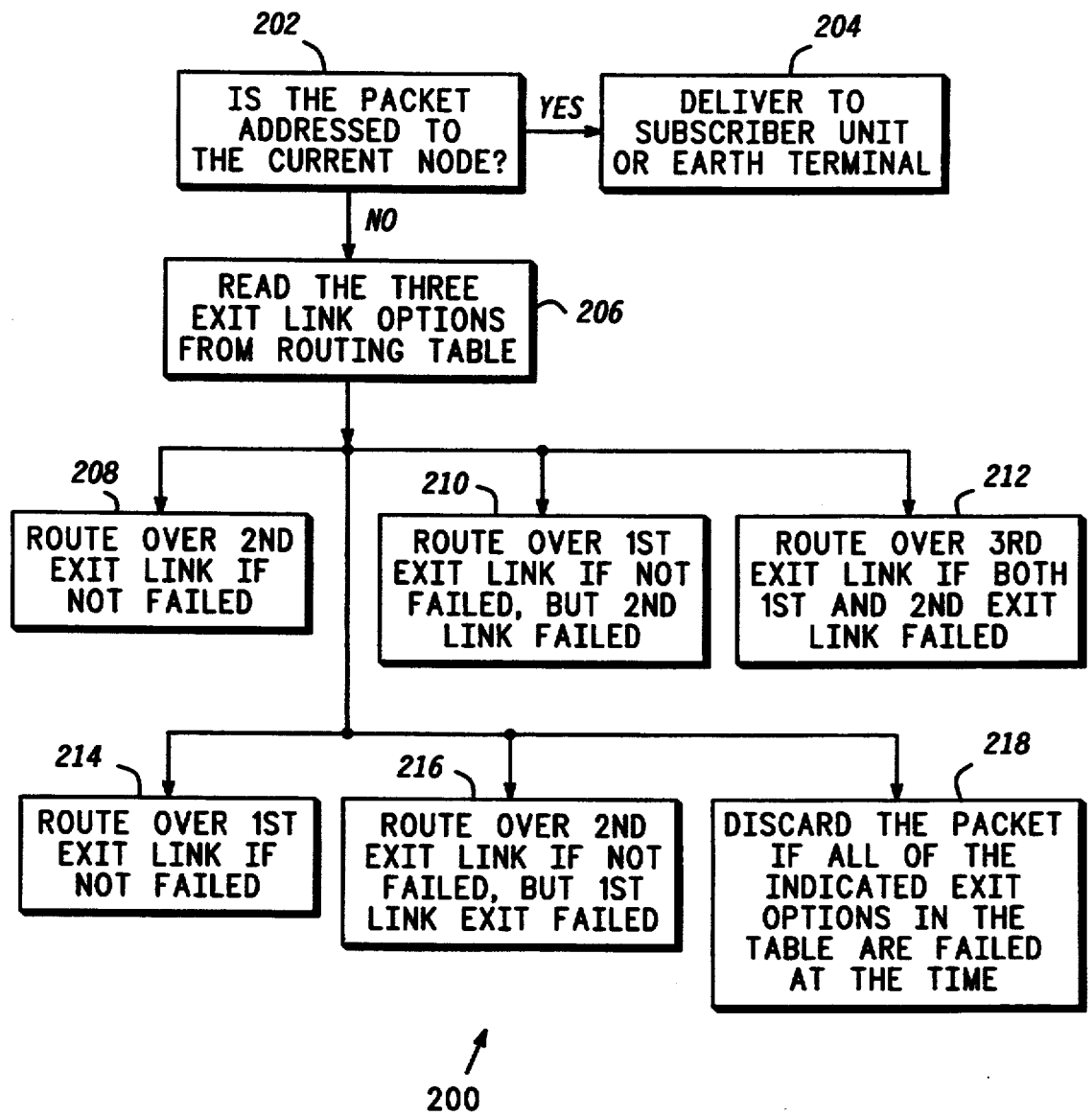
FIG. 9 shows a parallel hardware implementation of packet routing logic within an originating node suitable for use in a preferred embodiment of the present invention.

FIG. 9 shows a parallel hardware implementation of packet routing logic within an originating node suitable for use in a preferred embodiment of the present invention. The originating node is the satellite node receiving the packet either over subscriber link 16 (FIG. 1) from a subscriber unit 26 (FIG. 1), or over earth links 15 (FIG. 1) from gateway 22 (FIG. 1). As previously discussed, the originating node desirably has an estimate of the remoteness of the packer's destination in terms of minimum hop count from the originating node. The minimum hop count distance is based on minimal hop routing in a healthy constellation (i.e., with no failures). The remoteness estimate is desirably only used by the originating node as a decision making lower bound threshold. The remoteness estimate parameter is referred to as a minimal hop count distance (MHCD). In a preferred embodiment, this information is either conveyed to and recorded in the originating node through call set-up messages from the call processing gateway, or calculated in real time (e.g., through pure hardwired logic) based on the indicated destination within the packet. In another preferred embodiment, the packet destination may be indicated by a subfield of 3 bits, for example, indicating an orbit number and by a 3 or 4-bit subfield indicating a particular satellite within that plane.

The originating node checks the indicated MHCD against a setable threshold, called here the Minimum Hop Count Threshold (MHCT) which is programmed into the satellite node by the SCS. The originating node routes the packet over the second or the first exit link choices indicated by the routing table depending on whether the MHCD is found to be below or above the specified MHCT threshold. Thus, the packet is sent over the more indirect (longer) path when hop count delays allow it, and leaves the links used in a more direct path (having minimal hop routes) for packets which need to reach a more remote destination. This directed randomization feature prevents link congestion by load splitting. The load splitting is achieved effectively on a call by call basis since all packets from the same call will generally belong to the same source - destination hop count distance. Those of skill in the art see that delay dithers associated with voice data are eliminated. One embodiment of routing logic in the origin node is given in FIG. 9 presented in a form for parallel implementation in hardware for simplicity and speed purposes.

Referring to FIG. 9, task 202 determines if a packet is addressed to the current node. Task 204 delivers the packet on a downlink to an earth terminal or subscriber unit. When the packet is not addressed to the current node, the three exit link options are read from the routing table in task 206. Task 208 routes the packet over the second choice exit link if it has not failed. In a preferred embodiment, task 208 routes the packet over the second choice exit link if it has not failed and the MHCD is less than the MHCT.

Task 210 routes the packet over the first choice exit link when the second choice exit link has failed. In a preferred embodiment, task 210 routes the packet over the first choice exit link when the second choice exit link has failed and the MHCD is less than the MHCT. Task 212 routes the packet over the third choice exit link when the first and second choice exit links have both failed. Task 214 routes the packet over the first link if it has not failed. In a preferred embodiment, task 214 routes the packet over the first link if it has not failed and the MHCD is greater than or equal to the MHCT. Task 216 routes the packet over the second link if it has not failed. In a preferred embodiment, task 216 routes the packet over the second link if it has not failed and the MHCD is greater than or equal to the MHCT. Task 218 discards the packet if all exit link options listed in the table have failed.

Figure 10:
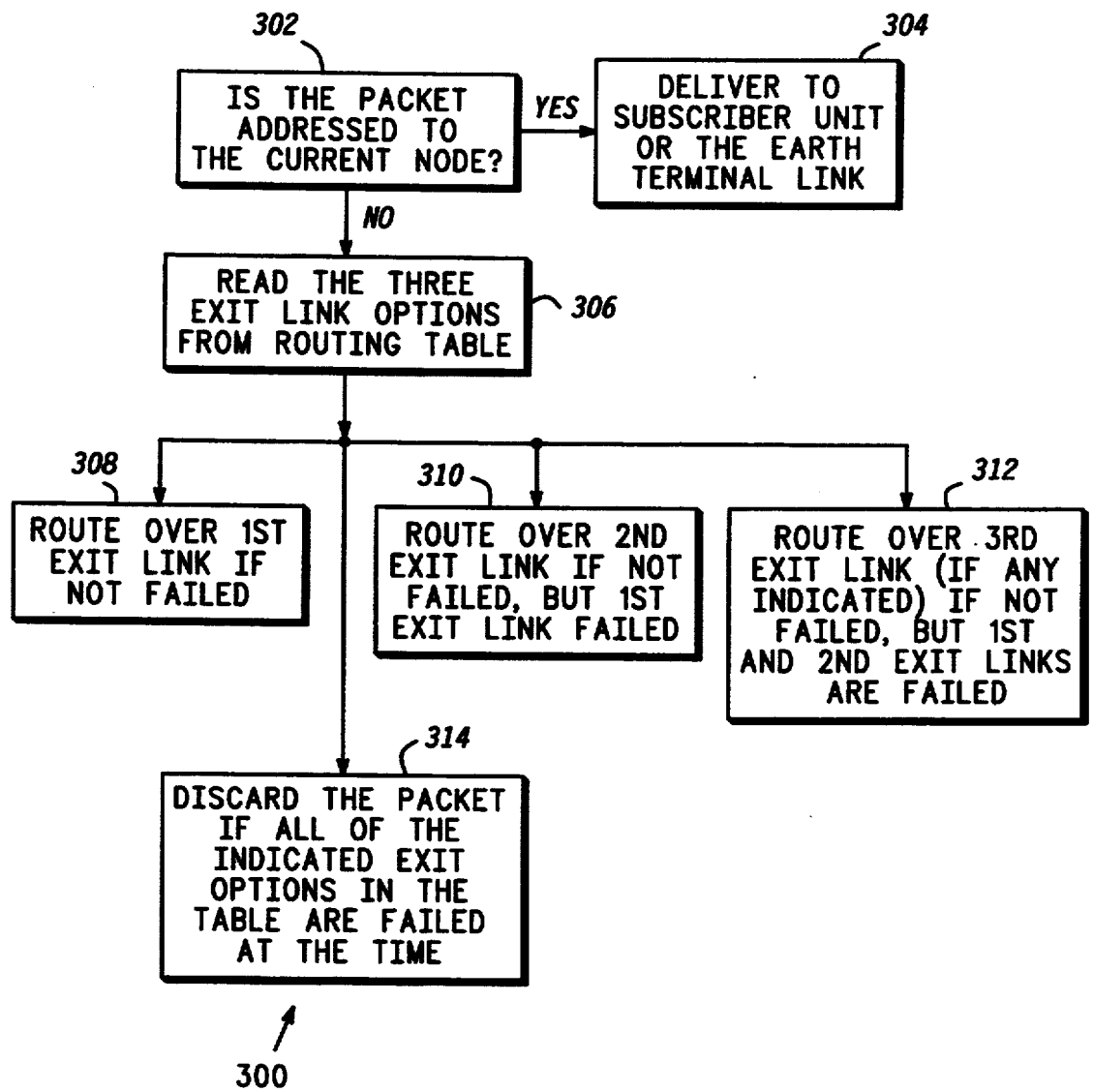
FIG. 10 shows a parallel hardware implementation of packet routing logic within a non-originating node suitable for use in a preferred embodiment of the present invention.

FIG. 10 shows a parallel hardware implementation of packet routing logic within a non-originating node suitable for use in a preferred embodiment of the present invention. The routing logic used to switch the packet at any node other than the node which originated the packet is described by procedure 300. A satellite node routes a packet over the first exit link option indicated in the routing table (for that state of the constellation configuration) if that link has not failed. Otherwise, it checks the second exit link indicated (if any) if it is not failed. Otherwise the third exit link indicated (if any) is checked and routes the packet over it if it is not failed. When all exit link choice options have failed, the packet is dropped and the switching process within the node is complete. One embodiment of parallel fast hardware implementation of this logic is given in FIG. 10.

Referring to FIG. 10, task 302 determines if the packet is addressed to the current node, and if it is, task 304 delivers the packet on a downlink to an earth terminal or subscriber unit. When the packet is not addressed to the current node, the three exit link options are read from the routing table in task 306. Task 308 routes the packet over the first choice exit link if it has not failed. Task 310 routes the packet over the second choice exit link when the first choice exit link has failed. Task 312 routes the packet over the third choice exit link when the first and second choice exit links have both failed. Task 314 discards the packet if all exit link options listed in the table are failed.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provides an improved method and apparatus of routing data packets among nodes in a communication system where the nodes are moving with respect to each other, and where the connections or links between the nodes are changing as a function of the position of the node, and due to link failures. These advantages include a highly distributed routing method that is implemented autonomously by each node. Another advantage of the routing method is that uniforminity of usage of network links is achieved while limiting number on hops on each path used for routing. Another advantage of the present invention is that the routing method achieves uniforminity which helps prevent link congestion. Another advantage is that no routing information is required to be maintained or updated in the SCS or GWs. Another advantage is that the routing method actually prevents congestion, rather than reacts to it as in prior art systems. Another advantage is that the routing method is link failure proof and routes data packets around link failures using pre-computed alternative link choices for each node.

What is claimed is:

1. In a communication system comprising a plurality of nodes that communicate with each other over links wherein each of said links has a link usage probability (LUP) associated therewith, said LUP being proportional to a number of times an associated link is part of a selected route, a method of routing data packets among said plurality of nodes comprising the steps of:

(a) finding alternative minimum hop routes between a source node and a destination node, each of said alternative minimum hop routes comprising a sequence of links over which to send a data packet;

(b) temporarily updating said LUP for each link associated with each of said alternative minimum hop routes, said temporarily updating step performed by increasing said LUP proportionally to a number of times said associated link is part of one of said alternative minimum hop routes;

(c) calculating a network routing entropy (NRE) for each of said alternative minimum hop routes using said LUPs associated with each link of said alternative minimum hop routes;

(d) selecting a first choice minimum hop route from said alternative minimum hop routes, said first choice minimum hop route having a largest of said NREs; and (e) routing said data packet from said source node to said destination node over said first choice minimum hop route.

2. A method as claimed in claim 1 further comprising the step of updating said LUP for each link associated with said first choice minimum hop route by increasing said LUP proportionally to said number of times each link of said first choice minimum hop route is part of said first choice minimum hop route.

3. A method as claimed in claim 1 further comprising the step of determining, for each of said alternative minimum hop routes, a link having a maximum value of said LUPs, and wherein the selecting step includes the step of choosing said first choice minimum hop route having said link with a lowest of said maximum value of said LUPs.

4. A method as claimed in claim 1 wherein the determining step further comprises the step of determining which links are not available for transfer of said data packet during said predetermined time periods, said links being shut off as said nodes change said orbital position.

5. A method as claimed in claim 1 wherein said alternative minimum hop routes includes a transit node in said sequence of links, said transit node being one node on said first choice minimum hop route, and wherein each node of said plurality of nodes has a plurality of links associated therewith, and wherein the selecting further comprises the step of selecting first choice minimum hop routes for each source - destination pair of nodes of said plurality of nodes, and said method further comprises the step of:

calculating, for said transit node, a percentage each link associated with said transit node is identified by said first choice minimum hop routes that use said transit node for routing to said destination node, and wherein the routing step comprises the step of routing said data packet away from said transit node to said destination node over one of said plurality of links associated with said transit node based on said percentage.

6. A method as claimed in claim 5 further comprising the steps of:

generating a table for said transit node including said percentage for each link of said plurality of links associated with said transit node; and sending said table to said transit node.

7. A method as claimed in claim 6 wherein the generating step further comprises the step of generating said table for each node of said plurality of nodes.

8. A method as claimed in claim 1 further comprising the step of storing said first choice minimum hop route for said destination node in each node of said plurality of nodes.

9. A method as claimed in claim 1 further comprising the step of determining available links that will be usable during a predetermined time period, and said finding step further comprises the step of considering only said available links for finding said alternative minimum hop routes.

10. A method as claimed in claim 9 wherein said nodes are orbiting satellite communication stations and wherein the determining step further comprises the step of determining available links during predetermined time periods, said predetermined time periods based on different constellation configurations for said plurality of nodes, said constellation configurations including orbital position of each of said nodes during each of said predetermined time periods including links planned to be turned off during each of said predetermined time periods.

11. A method as claimed in claim 10 wherein the determining step further comprises the step of determining failed links and links not available for transfer of said data packet for each of said predetermined time periods.

12. A method as claimed in claim 11 further comprising the steps of repeating the determining, the finding, the temporarily updating, the calculating and the selecting steps for each of said predetermined time periods, and generating a list of first choice minimum hop routes for each of said constellation configurations.

13. A method as claimed in claim 1 wherein the finding step comprises the step of finding additional alternative minimum hop routes when the finding step finds only one of said alternative minimum hop routes, said alternative minimum hop routes including routes having less than a predetermined number of hops, said predetermined number being greater than a number of hops of said one of said alternative minimum hop routes.

14. A method as claimed in claim 2 further comprising the step of repeating the finding, the temporarily updating, the calculating, the selecting and the updating steps for all source - destination node combinations of said plurality of nodes.

15. In a communication system comprised of a plurality of nodes that move with respect to each other and communicate with each other over links, a method of routing data packets among said plurality of nodes comprising the steps of:

determining available links during each of a plurality of predetermined time periods, each time period based on different constellation configurations for said nodes, said constellation configurations including orbital position of each of said nodes during each of said predetermined time periods;

finding, for each of said constellation configurations, minimum hop routes between source and destination node pairs, each of said minimum hop routes comprising a sequence of said available links over which to send a data packet between a source node and a destination node;

calculating a link usage probability (LUP) for each of said links of said sequences, said LUP based on a number of times a link is used in each of said sequences;

calculating a network routing entropy for each of said minimum hop routes based on said LUP of each link of said minimum hop routes;

selecting, for each of said source and destination node pairs, one of said minimum hop routes for each of said constellation configurations, said one minimum hop route resulting in a largest network routing entropy (NRE); and routing, during said predetermined time periods associated with said constellation configurations, said data packet between said source node and said destination node over said one minimum hop route.

16. A method as claimed in claim 15 wherein:

the finding step comprises the step of finding alternative minimum hop routes when the finding step finds only one minimum hop route, said alternative minimum hop routes including routes having less than a predetermined number of hops, said predetermined number based on an acceptable delay for a type of said data packet, and the selecting step further comprises the step of selecting second and third choice minimum hop routes from said minimum hop routes and said alternative minimum hop routes, said second and third choice minimum hop routes resulting in a next largest NRE.

17. A communication system that routes data packets over minimum hop routes resulting in a distributed usage of communication links, said minimum hop routes comprising a list of said communication links to send a data packet between a source node and a destination node, said system comprising:

a plurality of nodes that move with respect to each other, said nodes coupled by said communication links;

multi-channel transceivers associated with each node of said plurality of nodes for sending data packets over said communication links using said minimum hop routes; and a control facility coupled to said nodes for determining which of said communication links will be available during predetermined time periods, finding said minimum hop routes between said nodes, calculating link usage probabilities (LUPs) for each communication link of said minimum hop routes, calculating a network routing entropy (NRE) based on said LUPs, and selecting a first choice minimum hop route from said minimum hop routes for said source node and said destination node based on said NRE.

18. A communication system as claimed in claim 17 wherein said first choice minimum hop routes include a transit node in said sequence of links, said transit node being one node on said first choice minimum hop route, and wherein said control facility further comprises:

means for calculating a percentage each communication link of said plurality associated with said transit node that is identified by said first choice minimum hop route that uses said transit node; and means for instructing said transceiver coupled to said transit node to send said data packet from said transit node over one of said communication links associated with said transit node based on said percent.

19. A communication system as claimed in claim 17 further comprising a storage medium on each node coupled to said processors, said storage medium stores a table including said first choice minimum hop route, said table being sent from said control facility to each node of said plurality of nodes over an uplink.

20. A communication system as claimed in claim 17 wherein said control facility includes means for finding alternative hop routes when only one minimum hop route is found, said alternative hop routes including routes having hop a length less than an acceptable threshold for a type of said data packet, said acceptable threshold based on a delay associated with said alternative hop route.

* * * * *